United States Patent [19]

Matsumoto et al.

[11] 4,131,636

[45] Dec. 26, 1978

[54] CROSS-LINKABLE VINYL CHLORIDE RESIN COMPOSITION

[75] Inventors: Yasuhiro Matsumoto, Nara; Hisanori Eguchi, Izumiohtsu, both of Japan

[73] Assignee: Dainippon Ink & Chemicals Inc., Tokyo, Japan

[21] Appl. No.: 865,129

[22] Filed: Dec. 28, 1977

Related U.S. Application Data

[63] Continuation of Ser. No. 674,167, Apr. 6, 1976, abandoned.

[30] Foreign Application Priority Data

Apr. 10, 1975 [JP] Japan .................................. 50-42785

[51] Int. Cl.$^2$ ...................... C08L 33/04; C08L 23/08; C08L 51/04
[52] U.S. Cl. .............................. 260/875; 260/876 R; 260/882; 260/891; 260/897 B; 260/899; 260/901
[58] Field of Search ................... 260/875, 876 R, 882, 260/884, 891, 897 B, 899, 901, 878 R

[56] References Cited

U.S. PATENT DOCUMENTS

| | | |
|---|---|---|
| 3,726,946 | 4/1973 | Severini et al. .................. 260/875 X |
| 3,761,542 | 9/1973 | Kosaka et al. .................. 260/878 R |
| 3,859,383 | 1/1975 | Tanno et al. .................. 260/876 R |
| 3,859,384 | 1/1975 | Carty et al. .................. 260/876 R |
| 3,859,389 | 1/1975 | Carty et al. .................. 260/876 R X |
| 3,947,525 | 3/1976 | Robertson et al. .......... 260/878 R X |
| 3,956,425 | 5/1976 | Nagoshi et al. .................. 260/876 R |

OTHER PUBLICATIONS

Ritchie, *Vinyl and Allied Polymers* I, (Iliffe Books Ltd., 1972), pp. 161–163.
Matthews, *Vinyl and Allied Polymers* II, (Iliffe Books Ltd., 1972), p. 81.
Penn, *PVC Technology*, 3rd Ed. (Wiley Interscience, 1971), pp. 233–236, 255.

*Primary Examiner*—Thomas De Benedictis, Sr.
*Attorney, Agent, or Firm*—Sherman & Shalloway

[57] ABSTRACT

A cross-linkable vinyl chloride resin composition comprising as indispensable components 100 parts by weight of a vinyl chloride resin, 5.0 to 80 parts by weight of an organic peroxide-cross-linkable elastomer, 0.1 to 5.0 parts by weight of an anti-scorching agent, 1 to 4 parts by weight of a polymerizable compound having at least two double bonds and 0.05 to 5.0 parts by weight of an organic peroxide.

19 Claims, No Drawings

CROSS-LINKABLE VINYL CHLORIDE RESIN COMPOSITION

This is a continuation, of Application Ser. No. 674,167, filed Apr. 6, 1976, now abandoned.

The present invention relates to a novel cross-linkable vinyl chloride resin composition. More particularly, the invention relates to a vinyl chloride resin composition having an excellent cross-linking property, which does not cause scorching (premature partial cross-linking at the molding step).

As is well-known in the art, vinyl chloride resins (hereinafter referred to as "PVC resins") as well as other thermoplastic resins, are defective in their resistance to thermal deformation at high temperatures, and therefore, their uses are limited and it has been considered that they cannot be used at such high temperatures as exceeding 60°–70° C.

Intermolecular cross-linking by organic peroxides and the like has recently been proposed and investigated as means for improving the resistance to thermal deformation in thermoplastic resins, and this technique has now been practically worked in the art. Polyethylene can be mentioned as a typical instance of thermoplastic resins to which this technique is applied. Similar attempts have been made to improve the resistance to thermal deformation in PVC resins. In the case of PVC resins, however, since chlorine atoms are contained in the molecule chain, dehydrochlorination is readily caused by radicals formed from organic peroxides, resulting in reduction of the cross-linking property, violent discoloration, blowing by abnormal decomposition of organic peroxides by hydrogen chloride and occurrence of so-called "scorching" phenomenon where cross-linking is initiated at the molding step, i.e., in an extruder, an injection molding machine or the like. These are serious defects involved in PVC resins.

Various proposals have heretofore been made as regards the improvement of the resistance to thermal deformation or for overcoming discoloration or blowing. For example, there have been proposed methods in which organic peroxide-cross-linkable elastomers such as ethylene-vinyl acetate-vinyl chloride graft copolymers and acrylonitrile-butadiene rubbers (NBR) as blended into PVC resins and the blends are cross-linked by organic peroxides. However, no generic method capable of solving simultaneously the problem of "scorching phenomenon" as well as the foregoing problems of thermal deformation, discoloration and blowing has been developed. Accordingly, the method for cross-linking PVC resins by organic peroxides has not yet been practically worked in the art.

In view of the above-mentioned state of the art, we made research works on prevention of occurrence of "scorching phenomenon" in the blend system of a PVC resin and an organic peroxide-cross-linkable elastomer such as mentioned above. As a result, it was found that phenolic compounds, amine compounds, thiourea compounds and benzimidazole compounds are very effective as scorch retarders. Based on this finding, we have now completed the present invention.

It is a primary object of the present invention to provide a PVC resin composition having an excellent cross-linking property, in which problems encountered in organic peroxide cross-linking of PVC resins, such as discoloration and blowing and scorching at the molding step can be overcome.

More specifically, in accordance with the present invention, there is provided a PVC resin composition comprising as indispensable components 100 parts by weight (hereinafter referred to merely as "parts") of a PVC resin, 5 to 80 parts of an organic peroxide-cross-linkable elastomer, 0.1 to 5.0 parts of an anti-scorching agent, 1 to 4 parts of a polymerizable compound having at least two double bonds and 0.05 to 5.0 parts of an organic peroxide, which composition may further comprise additives generally used for processing of PVC resins, such as a plasticizer, a stabilizer, a filler and the like, according to need.

In the present invention, since both the organic peroxide-cross-linkable elastomer and the polymerizable compound having at least two double bonds each have an excellent cross-linking property, they are effective as cross-linking assistants for improving the cross-linking property of the PVC resin and preventing decomposition and discoloration by dehydrochlorination of the PVC resin at the cross-linking step. Therefore, they are also effective for preventing blowing by abnormal decomposition of the organic peroxide by hydrogen chloride.

Since the anti-scorching agent has an activity to catch small quantities of radicals, it is believed that it catches radicals prematurely generated from the organic peroxide during molding in an extruder or the like and shows the scorch-preventing effect.

According to the present invention, a cross-linkable PVC resin composition having practical utility and excellent cross-linking property in which the scorching phenomenon does not take place at the molding step and discoloration, decomposition or blowing is not caused at the cross-linking step, can be obtained by adding at one time all of the above-mentioned additives, though the reason why the addition of these additives, which have peculiar effects, respectively, will result in such advantages has not been completely elucidated.

The PVC resin that can be used in the present invention includes a vinyl chloride homopolymer having an average degree of polymerization of 700 to 4000 and a copolymer of vinyl chloride with at least one monomer copolymerizable with vinyl chloride. A mixture of two or more of such vinyl chloride homopolymers and/or copolymers can also be used as the PVC resin in the present invention.

As the comonomer copolymerizable with vinyl chloride, there can be mentioned, for example, vinyl esters of alkanoic, alkane-dioic and benzene-carboxylic acids having 1 to 18 carbon atoms, such as vinyl acetate, vinyl propionate, vinyl pivalate and vinyl laurate; alkyl esters of acrylic and methacrylic acid having 1 to 18 carbon atoms in the alkyl portion, such as methyl, ethyl, propyl, butyl and 2-ethylhexyl esters of acrylic and methacrylic acids; other acrylic compounds such as acrylic acid amides, acrylonitrile and esters of acrylic acid and methacrylic acid, e.g., glycidyl and alkylaminoether esters of acrylic and methacrylic acids; lower olefins such as ethylene, propylene and butylene; vinyl halides such as vinyl fluoride, vinyl difluoride and vinyl dichloride; aromatic vinyl compounds such as styrene and α-methylstyrene; N-vinyl compounds such as vinylpyrrolidone and vinylsulfonic acids and salts thereof; allyl compounds such as allyl chloride, allylacetic acid and allyl alcohol; and mono-alkyl and di-alkyl esters of maleic acid and alkyl esters of crotonic acid having 1 to 18 carbon atoms in the alkyl portion, such as methyl, ethyl, propyl, butyl and 2-ethylhexyl esters.

The cross-linkable elastomer that can be used in the present invention includes elastomers that can be cross-linked by radical sources such as organic peroxides and have a compatibility with PVC resins. As such elastomer, there can be mentioned, for example, ethylene polymers such as chlorinated polyethylene, ethylene-vinyl acetate copolymers and ethylene-vinyl acetate-vinyl chloride graft copolymers, and acrylonitrile-butadiene rubbers. Use of an ethylene-vinyl acetate copolymer having a vinyl content of 30 to 80% by weight and a number average molecular weight of at least 500, chlorinated polyethylene which is amorphous and has a degree of chlorination of 25 to 65%, and an ethylene-vinyl acetate-vinyl chloride graft copolymer having an ethylene-vinyl acetate content of 20 to 70% by weight is especially preferred. In view of the compatibility with the PVC resin and other factors, it is preferred that the elastomer be used in an amount of 5 to 80 parts per 100 parts of the PVC resin. In the present invention, ethylene-vinyl acetate copolymers are most preferred in view of the cross-linking property and other factors.

As the anti-scorching agent that can be used in the present invention, there can be mentioned, for example, (a) hindered phenolic compounds which are substituted by an alkyl group, a phenyl group or the like at the orthoposition to at least one phenolic OH group, such as 2,6-di-t-butyl-p-cresol, 2,2'-methylene-bis-(4-methyl-6-t-butylphenyl), 4,4'-thio-bis-(6-t-butyl-3-methyl-phenol), 1,3,5-trimethyl-2,4,6-tris-(2',6'-di-t-butyl-p-cresyl) benzene and 4,4'-butylidene-bis-(6-t-butyl-3-methylphenol), (b) non-hindered phenolic compounds such as 4,4'-isopropylidene-diphenol, (c) amine compounds such as phenyl-β-naphthylamine, phenyl-α-naphthylamine and diphenyl-p-phenylene diamine, (d) thiourea compounds such as 1,3-bis-(dimethylamino-propyl)-2-thiourea, and (e) benzimidazole compounds such as 2-mercaptobenzimidazole. These anti-scorching agents may be used singly or in the form of a mixture of two or more of them. Among these anti-scorching agents, the hindered phenolic compounds (a) are most preferred, because they hardly reduce the degree of cross-linking after the cross-linking step. Non-hindered phenolic compounds (b), amine compounds (c), thiourea compounds (d) and benzimidazole compounds (e) reduce the degree of cross-linking to some extent as compared with the hindered phenolic compounds (a), and therefore, when these anti-scorching agents are employed, physical properties of molded articles such as the resistance to thermal deformation are degraded to some extent.

It is preferred that the anti-scorching agent is incorporated in an amount of 0.1 to 5.0 parts per 100 parts of the PVC resin. When the amount of the anti-scorching agent is smaller than 0.1 part, no substantial scorch-preventing effect can be obtained. If the amount of the anti-scorching agent exceeds 5.0 parts, such adverse effects as reduction of the degree of cross-linking are caused.

As the polymerizable compound having at least two double bonds, that can be used in the present invention, there can be mentioned, for example, triallyl cyanurate, triallyl isocyanurate, diallyl phthalate, divinylbenzene, trimethylolopropane trimethacrylate and diethylene glycol dimethacrylate. Satisfactory results can be obtained when the polymerizing compound is used in an amount of 1 to 4 parts per 100 parts of the PVC resin. When the amount of the polymerizable compound is smaller than 1 part, no substantial improvement of the resistance to thermal deformation can be obtained. When the amount of the polymerizable compound exceeds 4 parts, the properties are not improved remarkably but the manufacturing cost is increased. In general, better results are obtained when the compound is incorporated in an amount of about 3 parts per 100 parts of the PVC resin.

In the present invention, it is preferred to use an organic peroxide characterized in that the temperature at which the half-life period is 1 minute is within a range of from 100 to 250° C. Specific examples of such preferred organic peroxide include dicumyl peroxide, 1,3-bis-(t-butylperoxyisopropyl)benzene, 2,5-dimethyl-2,5-di-(t-butylperoxy)hexane, 2,5-dimethyl-2,5-(t-butylperoxy)-hexane-3 and di-t-butylperoxide. It is preferred that the organic peroxide be used in an amount of 0.05 to 5.0 parts per 100 parts of the PVC resin.

In the present invention, in addition to the foregoing indispensable components, additives generally used for processing of PVC resins, such as plasticizers, stabilizers, fillers, foaming agents, flame retardants and pigments may be incorporated into the PVC resin composition according to need.

The composition of the present invention is first formed into uncross-linked pellets and these pellets are molded into intended articles by using an extruding molding machine, an injection molding machine or the like.

The pelletization is generally accomplished by kneading components other than the organic peroxide at 150 to 170° C., kneading the organic peroxide into the mixture at 100 to 120° C. and cutting the kneaded mixture into pellets. Conditions of the molding operation using these pellets are as follows:

For example, when an extruder having a screw diameter of 30 mm, a length-diameter ratio L/D of 23 and a compression ratio of 2.5 is employed, extrusion can be performed while elevating the temperatures of the kneading zone and die portion of the extruder to 140° C., if the temperature of the feed zone (the zone below the hopper) is 110° C. Under these conditions, occurrence of scorching can be effectively prevented. Indicentally, when the anti-scorching agent is not added, if the temperature of the feed zone is 110° C., scorching is caused to occur by elevating the temperatures of the kneading zone and die portion of the extruder to about 130° C. In general, if the temperatures of the kneading zone and die portion of the extruder are low, an excessive load is imposed on the extruder and the extrusion rate is lowered. Accordingly, it is preferred that the extrusion is conducted at a temperature as high as possible. In this connection, the composition of the present invention shows an excellent effect.

As is seen from the foregoing illustration, when the cross-linkable PVC resin composition of the present invention is employed, a PVC resin cross-linked product having a high practical utility can be obtained without occurrence of the undesired scorching phenomenon because of excellent cross-linking characteristics of the composition, and the composition of the present invention can be applied to fields where PVC resin compositions have not heretofore been used. Accordingly, the present invention makes great contributions to the art. The cross-linkable PVC resin composition of the present invention is suitable as a molding material for the production of heat-resistant wire coatings, packings, oil seals, flooring materials, heat-resistant hoses and heat-insulating materials.

The present invention will now be described in detail by reference to the following Examples and Comparative Examples that by no means limit the scope of the invention.

Various properties mentioned in these Examples were measured according to the following methods.

Tensile Test in Normal State:

The sample was tested at 23° C. at a pulling rate of 100 mm/min by an Instron tester using a dumb-bell No. 3, and the 100% modulus, tensile strength and elongation were measured.

Resistance to Thermal Aging:

After thermal aging in a gear oven, the residual ratio of elongation based on the original elongation in the normal state was measured.

Thermal Deformation Ratio:

According to the method of JIS K-6723, the sample was allowed to stand at 180° C. under a load of 2 Kg for 30 minutes, and then, the deformation ratio was determined.

Stability of Brabender Torque:

By using a mixing type roller head of a Brabender Plastograph, 50 g of pellets of the uncross-linked PVC resin composition were filled and rotation was initiated at 140° C. and 30 rpm. The time required for initiation of cross-linking and increase of the torque was measured. The longer is this time, the less is the risk of scorching.

Extrusion Moldability:

Pellets of the uncross-linked PVC composition were extruded by using an extruder having a screw diameter of 30 mm under conditions of a below-hopper temperature of 110° C., kneading zone and die portion temperatures of 130° C. and a rotation number of 20 rpm, and it was examined whether or not the extrusion was possible without occurrence of the scorching phenomenon.

EXAMPLE 1 AND COMPARATIVE EXAMPLES 1 TO 4

A mixture of 100 parts of a PVC resin (Geon 103EP-8 having a degree of polymerization of 800 and manufactured by Nippon Zeon Co.), 38 parts of DOP (W-520 manufactured by Dainippon Ink & Chemicals), 20 parts of an ethylene-vinyl acetate copolymer (Evathlene 410 having a vinyl acetate content of 60% by weight and manufactured by Dainippon Ink & Chemicals), 0.5 part of a hindered phenol anti-scorching agent [Sumilizer BBM, 4,4'-butylidene-bis(6-t-butyl-3-methylphenol), manufactured by Sumitomo Chemical Co.], 3 parts of triallyl cyanurate (manufactured by Musashino Chemical Co.), 5 parts of tribasic lead sulfate (manufactured by Sakai Chemical Industry Co.) and 1 part of lead stearate (manufactured by Sakai Chemical Co.) was kneaded for 5 minutes by a roll maintained at 165° C., and the roll temperature was lowered to 120° C. and 3 parts of 1,3-bis(t-butylperoxyisopropyl)benzene (Perkadox 14/40C manufactured by Kayaku-Noury) was added to the mixture. Then, the mixture was further kneaded for 5 minutes to obtain a resinous composition in the form of a sheet having a thickness of about 1 mm. Then, the sheet was preheated for 1 minute in a mold maintained at 180° C., and a pressure of 150 Kg/cm$^2$ was applied to the sheet and the sheet was heated for 9 minutes to effect cross-linking. The resulting cross-linked PVC resin product was tested to determine 100% modulus, tensile strength, elongation, elongation residual ratio after thermal aging, thermal deformation ratio, discoloration at the cross-linking step and blowing at the cross-linking step. Obtained results are shown in Table 1.

Comparative compositions indicated in Table 1 were molded, cross-linked and tested in the same manner as described above. However, the composition free of the organic peroxide was kneaded for 10 minutes by a roll maintained at 165° C. and then press-molded at 170° C. for 5 minutes.

Properties of the cross-linked products are shown in Table 1.

Table 1

|  | Example 1 | Comparative Example 1 | Comparative Example 2 | Comparative Example 3 | Comparative Example 4 |
| --- | --- | --- | --- | --- | --- |
| PVC ($\bar{p}$ = 800)[1] | 100 | 100 | 100 | 100 | 100 |
| DOP[2] | 38 | 52 | 55 | 38 | 50 |
| ethylene-vinyl acetate[3] copolymer | 20 | — | — | 20 | — |
| hindered phenol[4] anti-scorching agent | 0.5 | — | — | — | — |
| triallyl cyanurate[5] | 3 | — | 3 | 3 | — |
| tribasic lead sulfate[6] | 5 | 5 | 5 | 5 | 5 |
| lead stearate[7] | 1 | 1 | 1 | 1 | 1 |
| 1,3-bis(t-butylperoxyiso-[8] propylbenzene) | 3 | 3 | 3 | 3 | — |
| 100% modulus (Kg/cm$^2$) | 105 | 104 | 105 | 104 | 105 |
| tensile strength (Kg/cm$^2$) | 224 | 207 | 208 | 220 | 205 |
| elongation (%) | 280 | 200 | 195 | 279 | 320 |
| elongation residual ratio (%) after thermal aging[9] | 60 | 8 | 10 | 38 | 69 |
| discoloration at cross-linking step | not observed | observed | observed | not observed | — |
| blowing at cross-linking step | not observed | observed | observed | not observed | — |
| Time (minutes) of stable Brabender torque | 72 | 30 | 35 | 40 | — |
| extrusion moldability[10] | O | X | X | X | — |

Table 1-continued

|  | Example 1 | Comparative Example 1 | Comparative Example 2 | Comparative Example 3 | Comparative Example 4 |
| --- | --- | --- | --- | --- | --- |
| thermal deformation ratio (%) | 17 | 75 | 70 | 17 | 100 |

Notes:
[1] Geon 103EP-8 manufactured by Nippon Zeon Co..
[2] W-520 manufactured by Dainippon Ink & Chemicals.
[3] Evathlene 410 (having a vinyl acetate content of 60% by weight) manufactured by Dainippon Ink & Chemicals.
[4] Sumilizer BBM [4,4'-butylidene-bis(6-t-butyl-3-methylphenol)] manufactured by Sumitomo Chemical Co..
[5] Manufactured by Musashino Chemical Co..
[6] Manufactured by Sakai Chemical Industry Co..
[7] Manufactured by Sakai Chemical Industry Co..
[8] Perkadox 14/40C manufactured by Kayaku-Noury.
[9] Ratio of the residual elongation after standing at 120° C. for 100 hours to the original elongation in the normal state.
[10] O: extrusion molding was possible without scorching.
X: scorching took place in the extruder to degrade the surface condition of the molded product.

Properties of the respective compositions prepared by adjusting the amount of DOP (plasticizer), as shown in Table 1, so that the 100% modulus in the normal state was substantially equal in each composition were compared. As a result, it was found that not only the composition of Comparative Example 1 formed by adding the organic peroxide to PVC but also the composition of Comparative Example 2 formed by adding the organic peroxide and the polymerizable compound having at least two double bonds to PVC was inferior in the cross-linking property, and they were defective in that scorching was readily caused and discoloration or blowing took place at the cross-linking step. It was also found that the composition of Comparative Example 3 prepared by blending the ethylene-vinyl acetate copolymer into the composition of Comparative Example 2 was excellent in various properties over the compositions of Comparative Examples 1 and 2 but it was inferior in the time of the stable Brabender torque and when it was actually molded by the extruder, scorching was caused and the moldability was poor. In contrast, the composition of Example 1 including the hindered type phenolic compound as the antiscorching agent was excellent in the respective properties and the cross-linking property.

EXAMPLE 2 AND COMPARATIVE EXAMPLES 5 to 7

Resinous compositions were prepared from starting materials indicated in Table 2 in the same manner as described in Example 1, and properties of the compositions were examined in the same manner as described in Example 1 to obtain results shown in Table 2.

Table 2

|  | Example 2 | Comparative Example 5 | Comparative Example 6 | Comparative Example 7 |
| --- | --- | --- | --- | --- |
| PVC ($\bar{p}$ = 1050)[1] | 100 | 100 | 100 | 100 |
| tri-2-ethylhexyl trimellitate[2] | 30 | 55 | 30 | 50 |
| ethylene-vinyl acetate copolymer[3] | 30 | — | 30 | — |
| hindered phenol anti-scorching agent[4] | 0.5 | — | — | — |
| dibasic lead phthalate | 5 | 5 | 5 | 5 |
| triallyl isocyanurate[5] | 3 | 3 | 3 | — |
| dicumyl peroxide[6] | 3 | 3 | 3 | — |
| barium stearate | 1 | 1 | 1 | 1 |
| 100% modulus (Kg/cm$^2$) | 126 | 126 | 127 | 129 |
| tensile strength (Kg/cm$^2$) | 230 | 209 | 228 | 204 |
| elongation (%) | 281 | 197 | 283 | 343 |
| elongation residual ratio (%) after[7] thermal aging | 81 | 20 | 41 | 87 |
| thermal deformation ratio (%) | 15 | 70 | 16 | 100 |
| discoloration at cross-linking step | no observed | observed | not observed | — |
| blowing at cross-linking step | not observed | observed | not observed | — |
| time (minutes) of stable Brabender torque | 70 | 26 | 40 | — |
| extrusion moldability[8] | O | O | X | — |

Notes:
[1] Geon 103EP manufactured by Nippon Zeon Co..
[2] W-705 manufactured by Dainippon Ink & Chemicals.
[3] Evathlene 310 (having a vinyl acetate content of 70% by weight) manufactured by Dainippon Ink & Chemicals.
[4] Ionox 330 [1,3,5-trimethyl-2,4,6-tris(2',6'-di-t-butyl-p-cresyl)benzene] manufactured by Shell Chemical.
[5] Manufactured by Nippon Hydrogen Industry.
[6] Kayacumyl D manufactured by Kayaku-Noury.
[7] Ratio of the elongation after standing at 140° C. for 120 hours to the original elongation in the normal state.
[8] Same as in Table 1.

Properties of compositions prepared by using tri-2-ethylhexyl trimellitate excellent in the thermal aging resistance as the plasticizer and adjusting its amount so that the 100% modulus was substantially equal in the respective compositions were compared. As a result, it was found that, as will be apparent from Table 2, only the composition of Example 2 was excellent in the cross-linking property, did not cause discoloration or blowing at the cross-linking step and could be extrusion-molded without scorching.

EXAMPLE 3 AND COMPARATIVE EXAMPLES 8 TO 10

Compositions were prepared from starting materials indicated in Table 3 in the same manner as described in Example 1, and properties of these compositions were examined in the same manner as described in Example 1 to obtain results shown in Table 3.

Table 3

|  | Example 3 | Comparative Example 8 | Comparative Example 9 | Comparative Example 10 |
|---|---|---|---|---|
| PVC ($\bar{p}$ = 2300)[1] | 100 | 100 | 100 | 100 |
| tri-2-ethylhexyl trimellitate[2] | 35 | 62 | 35 | 58 |
| ethylene-vinyl acetate copolymer[3] | 30 | — | 30 | — |
| hindered phenol anti-scorching agent[4] | 0.5 | — | — | — |
| dibasic lead phosphite | 5 | 5 | 5 | 5 |
| lead stearate | 1 | 1 | 1 | 1 |
| trimethylolpropane trimethacrylate[5] | 3 | 3 | 3 | — |
| 2,5-dimethyl-2,5-di-(t-butylperoxy)hexane | 0.5 | 0.5 | 0.5 | — |
| 100% modulus (Kg/cm$^2$) | 130 | 131 | 130 | 130 |
| tensile strength (Kg/cm$^2$) | 235 | 210 | 234 | 210 |
| elongation (%) | 312 | 259 | 310 | 350 |
| elongation residual ratio (%) after[6] thermal aging | 90 | 42 | 60 | 91 |
| thermal deformation ratio (%) | 18 | 65 | 18 | 71 |
| discoloration at cross-linking step | not observed | observed | not observed | — |
| blowing at cross-linking step | not observed | observed | not observed | — |
| time (minutes) of stable Brabender torque | 70 | 30 | 40 | — |
| extrusion moldability[7] | O | X | X | — |

Notes:
[1] Kanevinyl S-2300 manufactured by Kanegafuchi Chemical Industry Co.
[2] W-705 manufactured by Dainippon Ink & Chemicals.
[3] Evathlene 450 (having a vinyl acetate content of 65% by weight) manufactured by Dainippon Ink & Chemicals.
[4] Yoshinox S [4,4'-thi-bis(6-t-butyl-3-methyl-phenol)] manufactured by Yoshitomi Pharmaceutical Ind.
[5] TD-1500 manufactured by Dainippon Ink & Chemicals.
[6] Ratio of the residual elongation after standing at 140° C. for 120 hours to the original elongation in the normal state.
[7] Same as in Table 1.

Properties of compositions prepared by using a PVC resin having a high degree of polymerization (2300) and adjusting the amount of the plasticizer so that the 100% modulus was substantially equal in the respective compositions were compared. As will be apparent from the results shown in Table 3, only the composition of Example 3 had an excellent cross-linking property, did not cause discoloration or blowing at the cross-linking step and could be extrusion-molded without scorching.

EXAMPLES 4 AND 5 AND COMPARATIVE EXAMPLES 11 TO 14

Compositions were prepared from starting materials indicated in Table 4 in the same manner as described in Example 1, and properties of these compositions were examined in the same manner as described in Example 1 to obtain results shown in Table 4.

Table 4

|  | Example 4 | Example 5 | Comparative Example 11 | Comparative Example 12 | Comparative Example 13 | Comparative Example 14 |
|---|---|---|---|---|---|---|
| PVC ($\bar{p}$ = 800)[1] | 100 | 100 | 100 | 100 | 100 | 100 |
| DOP[2] | 39 | 43 | 39 | 43 | 52 | 50 |
| chlorinated polyethylene[3] | 20 | — | 20 | — | — | — |
| ethylene-vinyl acetate-vinyl chloride graft copolymer[4] | — | 20 | — | 20 | — | — |
| hindered phenol anti-scorching agent[5] | 0.5 | 0.5 | — | — | — | — |
| triallyl cyanurate[6] | 3 | 3 | 3 | 3 | 3 | — |
| tribasic lead sulfate | 5 | 5 | 5 | 5 | 5 | 5 |
| lead stearate | 1 | 1 | 1 | 1 | 1 | 1 |
| 1,3-bis(t-butylperoxy[7] isopropyl)benzene | 3 | 3 | 3 | 3 | 3 | — |
| 100% modulus (Kg/cm$^2$) | 107 | 109 | 107 | 109 | 104 | 105 |
| tensile strength (Kg/cm$^2$) | 222 | 225 | 221 | 224 | 207 | 205 |
| elongation (%) | 272 | 271 | 270 | 269 | 200 | 320 |
| thermal deformation ratio (%) | 18 | 20 | 18 | 20 | 75 | 100 |
| discoloration at cross-linking step | not observed | not observed | not observed | not observed | observed | — |
| blowing at cross-linking step | not observed | not observed | not observed | not observed | observed | — |
| time (minutes) of stable Brabender torque | 70 | 70 | 39 | 38 | 30 | — |
| extrusion moldability[8] | O | O | X | X | X | — |

Notes:
[1] Geon 103EP-8 manufactured by Nippon Zeon Co..
[2] W-520 manufactured by Dainippon Ink & Chemicals.
[3] Elaslene 401A manufactured by Showa Denko K.K.
[4] Graftmer R-5 manufactured by Nippon Zeon Co..
[5] Sumilizer BBM [4,4'-butylidene-bis(6-t-butyl-3-methylphenol)] manufactured by Sumitomo Chemical Co..
[6] Manufactured by Nippon Hydrogen Industry.
[7] Perkado 14/40C manufactured by Kayaku-Noury.
[8] Same as in Table 1.

Properties of compositions prepared by using chlorinated polyethylene or ethylene-vinyl acetate-vinyl chloride graft copolymer as the cross-linkable elastomer and adjusting the amount of the stabilizer so that the 100% modulus was substantially equal in the respective compositions were compared. As will be apparent from the results shown in Table 4, only the compositions of Examples 4 and 5 had an excellent cross-linking property, did not cause discoloration or blowing at the cross-linking step and could be extrusion-molded without scorching.

EXAMPLES 6 TO 10 AND COMPARATIVE EXAMPLES 15 AND 16

Compositions were prepared from starting materials indicated in Table 5 in the same manner as described in Example 1, and properties of these compositions were examined in the same manner as described in Example 1 to obtain results shown in Table 5.

Table 5

|  | Example 6 | Example 7 | Example 8 | Example 9 | Example 10 | Comparative Example 15 | Comparative Example 16 |
|---|---|---|---|---|---|---|---|
| PVC ($\bar{p}$ = 1050)[1] | 100 | 100 | 100 | 100 | 100 | 100 | 100 |
| tri-2-ethylhexyl[2] trimellitate | 30 | 30 | 30 | 30 | 30 | 30 | 50 |
| ethylene-vinyl acetate[3] copolymer | 30 | 30 | 30 | 30 | 30 | 30 | — |
| hindered phenol[4] anti scorching agent | 0.5 | — | — | — | — | — | — |
| non-hindered phenol[5] anti scorching agent | — | 0.5 | — | — | — | — | — |
| amine anti scorching[6] agent | — | — | 0.5 | — | — | — | — |
| thiourea anti scorch-[7] ing agent | — | — | — | 0.5 | — | — | — |
| benzimidazole anti[8] scorching agent | — | — | — | — | 0.5 | — | — |
| dibasic lead phthalate | 5 | 5 | 5 | 5 | 5 | 5 | 5 |
| barium stearate | 1 | 1 | 1 | 1 | 1 | 1 | 1 |
| triallyl isocyanurate[9] | 3 | 3 | 3 | 3 | 3 | 3 | 3 |
| dicumyl peroxide[10] | 3 | 3 | 3 | 3 | 3 | 3 | 3 |
| 100% modulus (Kg/cm$^2$) | 126 | 120 | 118 | 121 | 119 | 127 | 126 |
| tensile strength (Kg/cm$^2$) | 230 | 220 | 223 | 225 | 230 | 228 | 209 |
| elongation (%) | 281 | 290 | 288 | 285 | 280 | 238 | 197 |
| elongation residual[11] ratio (%) after thermal aging | 81 | 81 | 55 | 60 | 61 | 41 | 20 |
| thermal deformation ratio (%) | 15 | 24 | 28 | 29 | 32 | 16 | 70 |
| time (minutes) of stable Brabender torque | 65 | 67 | 65 | 63 | 64 | 38 | 31 |
| extrusion-moldability[12] | O | O | O | O | O | X | X |

Notes:
[1] Geon 103EP manufactured by Nippon Zeon Co..
[2] W-705 manufactured by Dainippon Ink & Chemicals.
[3] Evathlene 310 (having a vinyl acetate content of 70% by weight) manufactured by Dainippon Ink & Chemicals.
[4] Ionox 330 [1,3,5-trimethyl-2,4,6-tris(2',6'-di-t-butyl-p-cresyl)benzene] manufactured by Shell Chemical.
[5] Bisphenol A (4,4'-isopropylidene-diphenol).
[6] Noklac D (phenyl-$\beta$-naphthylamine) manufactured by Shinko.
[7] Noklac NS-10-N [1,3-bis(dimethylaminopropyl)-2-thiourea] manufactured by Ouchi Shinko.
[8] Noklac MB (2-mercaptobenzimidazole) manufactured by Ouchi Shinko.
[9] Manufactured by Nippon Hydrogen Industry.
[10] Kayacumyl D manufactured by Kayaku-Noury.
[11] Ratio of the residual elongation after standing at 140° C. for 120 hours to the original elongation in the normal state.
[12] Same as in Table 1.

Properties of compositions prepared by using various anti-scorching agent were examined. As will be apparent from the results shown in Table 5, the composition prepared by using the hindered phenol anti-scorching agent had a best cross-linking property, and it was confirmed that the thermal deformation ratio of this composition was excellent by about 10% over, for example, the composition prepared by using the non-hindered phenol anti-scorching agent.

What is claimed is:

1. A cross-linkable vinyl chloride resin composition comprising as indispensable components 100 parts by weight of a vinyl chloride resin, 5.0 to 80 parts by weight of an organic peroxide-cross-linkable ethylene polymer elastomer selected from chlorinated polyethylene, ethylene-vinyl acetate copolymers, and ethylene-vinyl acetate-vinyl chloride graft copolymers, 0.1 to 5.0 parts by weight of an anti-scorching agent selected from hindered phenolic compounds, non-hindered phenolic compounds, amino compounds, thiourea compounds and benzimidazole compounds, 1 to 4 parts by weight of a polymerizable compound having at least two double bonds selected from triallyl cyanurate, triallyl isocyanurate, diallyl phthalate, divinylbenzene, trimethylolpropane trimethacrylate and diethylene glycol dimethacrylate and 0.05 to 5.0 parts by weight of an organic peroxide.

2. A cross-linkable vinyl chloride resin composition as set forth in claim 1 wherein the anti-scorching agent is a hindered phenolic compound.

3. A cross-linkable vinyl chloride resin composition as set forth in claim 1 wherein the anti-scorching agent is a non-hindered phenolic compound.

4. A cross-linkable vinyl chloride resin composition as set forth in claim 1 wherein the anti-scorching agent is an amine compound.

5. A cross-linkable vinyl chloride resin composition as set forth in claim 1 wherein the anti-scorching agent is a thiourea compound.

6. A cross-linkable vinyl chloride resin composition as set forth in claim 1 wherein the anti-scorching agent is a benzimidazole compound.

7. The cross-linkable vinyl chloride resin composition of claim 1 wherein the vinyl chloride resin is a vinyl chloride homopolymer having an average degree of polymerization of 700 to 4000 or a vinyl chloride copolymer with at least one monomer copolymerizable with vinyl chloride.

8. The cross-linkable vinyl chloride resin composition of claim 1 wherein said organic peroxide cross-linkable elastomer is an ethylene-vinyl acetate copolymer having a vinyl content of 30 to 80% by weight and a number average molecular weight of at least 500.

9. The cross-linkable vinyl chloride resin composition of claim 1 wherein said organic peroxide-cross-linkable elastomer is amorphous polyethylene having a degree of chlorination of 25 to 65%.

10. The cross-linkable vinyl chloride resin composition of claim 1 wherein said organic peroxide-cross-linkable elastomer is an ethylene-vinyl acetate-vinyl chloride graft copolymer having an ethylene-vinyl acetate content of 20 to 70% by weight.

11. The cross-linkable vinyl chloride resin composition of claim 2 in which the hindered phenolic compound is a member selected from the group consisting of 2,6-di-t-butyl-p-cresol, 2,2'-methylene-bis-(4-methyl-6-t-butylphenol), 4,4'-thio-bis-(6-t-butyl-3-methylphenol), 1,3,5-trimethyl-2,4,6-tris-(2',6'-di-t-butyl-p-cresol) benzene and 4,4'-butylidene-bis-(6-t-butyl-3-methylphenol).

12. The cross-linkable vinyl chloride resin composition of claim 1 wherein the organic peroxide is a member selected from the group consisting of dicumyl peroxide, 1,3-bis-(t-butylperoxyisopropyl)benzene, 2,5-dimethyl-2,5-di-(t-butylperoxy)hexane, 2,5-dimethyl-2,5-(t-butylperoxy)hexane-3 and di-t-butylperoxide.

13. A process for the preparation of cross-linkable vinyl chloride resin compositions, which comprises mixing, as indispensable components, 100 parts by weight of a vinyl chloride resin, 5.0 to 80 parts by weight of an organic peroxide-cross-linkable ethylene polymer elastomer selected from chlorinated polyethylene, ethylene-vinyl acetate copolymers and ethylene-vinyl acetate-vinyl chloride graft copolymers, 0.1 to 5.0 parts by weight of an anti-scorching agent selected from hindered phenolic compounds, non-hindered phenolic compounds, amino compounds, thiourea compounds and benzimidazole compounds, 1 to 4 parts by weight of a polymerizable compound having at least two double bonds selected from triallyl cyanurate, triallyl isocyanurate, diallyl phthalate, divinylbenzene, trimethylolpropane trimethacrylate and diethylene glycol dimethacrylate and 0.05 to 5.0 parts by weight of an organic peroxide.

14. A process for the preparation of cross-linkable vinyl chloride resin compositions according to claim 13 wherein the anti-scorching agent is a hindered phenolic compound.

15. A process for the preparation of cross-linkable vinyl chloride resin compositions according to claim 13 wherein the anti-scorching agent is a non-hindered phenolic compound.

16. A process for the preparation of cross-linkable vinyl chloride resin compositions according to claim 13 wherein the anti-scorching agent is an amine compound.

17. A process for the preparation of cross-linkable vinyl chloride resin compositions according to claim 13 wherein the anti-scorching agent is a thiourea compound.

18. A process for the preparation of cross-linkable vinyl chloride resin compositions according to claim 13 wherein the anti-scorching agent is a benzimidazole compound.

19. The process according to claim 13 which further comprises kneading the vinyl chloride resin, organic peroxide-cross-linkable elastomer, anti-scorching agent and polymerizable compound having at least two double bonds at 150 to 170° C., kneading the organic peroxide into the mixture at 100 to 120° C. and cutting the kneaded mixture into pellets.

* * * * *